(12) United States Patent
Kindle et al.

(10) Patent No.: US 7,267,539 B2
(45) Date of Patent: Sep. 11, 2007

(54) SYSTEM FOR AGGLOMERATING CHOPPED FIBER STRAND

(75) Inventors: Richard J. Kindle, Bowling Green, OH (US); John A. Cooper, Swanton, OH (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 11/149,162

(22) Filed: Jun. 10, 2005

(65) Prior Publication Data

US 2006/0006571 A1 Jan. 12, 2006

Related U.S. Application Data

(63) Continuation of application No. 10/291,322, filed on Nov. 8, 2002, now abandoned.

(51) Int. Cl.
 *B29C 67/02* (2006.01)
(52) U.S. Cl. ............... 425/222; 425/377; 425/456; 425/82.1; 264/69; 264/117
(58) Field of Classification Search ............... 425/82.1, 425/456, 377, 222; 264/69, 117
See application file for complete search history.

(56) References Cited

U.S. PATENT DOCUMENTS

| | | |
|---|---|---|
| 3,984,603 A | 10/1976 | Zechinati et al. |
| 4,107,250 A | 8/1978 | Zechinati et al. |
| 4,164,534 A | 8/1979 | Ogina |
| 4,840,755 A | 6/1989 | Nakazawa |
| RE33,542 E | 2/1991 | Musschoot |
| 5,002,827 A | 3/1991 | Shimada et al. |
| 5,185,204 A | 2/1993 | Shimizu et al. |
| 5,269,993 A | 12/1993 | Shimizu et al. |
| 5,512,008 A | 4/1996 | Musschoot |
| 5,578,535 A | 11/1996 | Hill et al. |
| 5,585,180 A | 12/1996 | Fadell |
| 5,639,807 A | 6/1997 | Secrist et al. |
| 5,693,378 A | 12/1997 | Hill et al. |
| 5,868,982 A | 2/1999 | Strait et al. |
| 5,945,134 A | 8/1999 | Strait et al. |
| 6,365,090 B1 | 4/2002 | Straight et al. |
| 6,365,272 B1 | 4/2002 | Masson et al. |
| 6,702,102 B2 | 3/2004 | Kraus et al. |
| 6,705,459 B1 | 3/2004 | Musschoot |
| 6,743,386 B2 * | 6/2004 | Lease ..................... 264/69 |

FOREIGN PATENT DOCUMENTS

WO  WO 01/05722  7/2000

\* cited by examiner

*Primary Examiner*—James P. Mackey
*Assistant Examiner*—Dimple Bodawala
(74) *Attorney, Agent, or Firm*—Robert D. Touslee

(57) ABSTRACT

A new system for making agglomerates of chopped glass fiber strand segments is disclosed and claimed. The agglomerates, made by feeding wet chopped fiber strand segments into a wave chamber having a vibrating curved surface that produces a wave-like flow pattern in the segments and agglomerates, have a substantially higher bulk density and greatly improved flow characteristics than conventional chopped strand reinforcements. The wet agglomerates are usually dried in any conventional dryer.

22 Claims, 5 Drawing Sheets

SYSTEM FOR AGGLOMERATING CHOPPED FIBER STRAND

This application is a continuation of, and claims priority benefit under 35 U.S.C. § 120 to, parent U.S. patent application Ser. No. 10/291,322, filed Nov. 8, 2002, now abandoned, the contents of which is incorporated by reference herein for all purposes.

This invention includes a method and system for agglomerating wet chopped glass, polymer, etc. fiber strand segments into pieces that are denser and more free flowing than normal chopped strand. The resultant product is useful in processes for making fiber reinforced plastics and in processes for making other fiber containing products.

Chopped strand reinforcement products such as chopped strand for thermoplastics are typically made by pulling fibers from a plurality of fiberizers while the material is in a molten state, cooling the fibers, coating the fibers with water and a chemical sizing, gathering the fibers into strands, chopping the strands into segments of desired lengths and drying the wet chopped strands in a vibrating flatbed oven and sorting the resultant dry chopped strand to remove undesirable lumps and fuzz. A typical process can be seen in U.S. Pat. No. 3,996,032. These types of processes produce chopped strand segments having a wide range of diameters and containing a wide range of numbers of fibers, e.g. from just a few fibers to 4000 or more fibers per segment.

Hundreds of millions of pounds of chopped strand products have been produced in the above described processes and while these products worked well in making fiber reinforced products of a wide variety. However, for several years there has existed a desire for a product that has a higher density, flows better through small openings in cone shaped bins and feeders and that contains fewer small diameter segments that tend to produce fuzz balls in the customers system.

Several processes have been disclosed for pelletizing or agglomerating chopped strand. These include U.S. Pat. Nos. 3,984,603, 4,107,250, 4,164,534, 4,840,755, 5,002,827, 5,185,204, 5,269,993, 5,578,535, 5,585,180, 5,639,807, 5,693,378, 5,868,982, 5,945,134 and WO 01/05722. While at least one of these processes produces chopped strand reinforcement segments that meet most or all of the desired improvements, there are still system and process improvements and efficiencies desired such as less costly, simpler and lower operating cost systems and processes.

SUMMARY OF THE INVENTION

The present invention includes a system and method for making agglomerated reinforcing fiber strand segments, such as agglomerated chopped strand for reinforcing plastics and products made by the method. The system comprises a chopper for chopping one or a plurality of wet strands of fibers having a chemical sizing on the circumferential surfaces of the fibers into segments, and agglomerator and a dryer for drying agglomerates of wet chopped strand segments, the improvement being an agglomerator comprising a non-rotating wave chamber having a generally horizontal, non-rotating, elongated, vibrating curved surface, working surface, for contacting the wet chopped strand segments, the working surface being generally concave in cross section in a plane perpendicular with the length of the working surface. The term "wave chamber" designates the type of action that the working surface produces in the chopped strand segments and agglomerates, moving the material upward on the working surface like an ocean wave and curling it over the top to slide back downwardly inside the chamber to the working surface where the wave action is repeated again and again until the agglomerates exit the wave chamber.

By generally horizontal is meant horizontal plus or minus up to about 10 degrees. Preferably the working surface declines from an upstream end to a downstream end by a variable amount up to about 6 degrees. By non-rotating is meant that the wave chamber does not rotate a full revolution, preferably doesn't rotate more than 180 degrees and most preferably doesn't rotate more than about 10 degrees. The preferred embodiments disclosed herein rotate, if at all, only due to the amplitude of vibration and spring action and any rotation is reciprocal, i.e., back and forth. By generally concave surface is meant that the working surface in cross section can have a constant radius or a changing radius of two or more radii. By wave action is meant a type of action similar to a breaking wave.

Preferably, but not necessarily, the contacting or working surface has a textured or non-stick surface to reduce tendency of the wet chopped strand segments to stick to said surface and to aid in achieving a wave action in the chopped strand segments and agglomerates. The frequency and/or amplitude of vibration can preferably be varied to produce and optimize the wave like movement of the wet chopped strand segments and agglomerates.

Preferably the dryer is a vibrating, flat bed dryer known for drying wet chopped strand segments. The system can have additional equipment at the dryer's downstream end or downstream of the dryer for sorting the agglomerated chopped strand segments to remove oversize and undersize pieces. The system can also have conveyor means for collecting the wet chopped strand segments from the chopper and delivering said segments to the vibratory wave chamber.

The method of the present invention includes chopping one or a plurality of strands of wet fiber into chopped strand segments, the segments also containing a chemical sizing on circumferential surfaces of the fibers, forming the wet segments into agglomerates and drying the agglomerates to form agglomerates of chopped fiber strands, the improvement comprising forming agglomerates by subjecting a layer of the wet chopped strand segments to vibration against the generally concave working surface of an elongated curved surface, the working surface comprising at least about a 60 degree arc circle with at least about 45-60 degrees of the arc being on one side of an imaginary vertical line extending through the lowest point on the working surface and the remainder, if any, lying on the opposite side of the vertical line. Preferably, the frequency and/or amplitude of the vibrators can be changed to optimize the wave action and quality of agglomerates at different feed rates and/or with different size or type of chopped strand segments. The front to exit of the vibrating curved surface can be declined to affect the retention time the segments and agglomerates are in the wave chamber and the capacity of the wave chamber.

The general appearance of the agglomerates in shape and size is similar to that of wild rice or grains of wheat. The agglomerates are about ⅛ to about ½ inch long and typically about ⅛ to about ¼ inch long. The diameter of the agglomerates can vary and can be changed to address the needs of different applications, but typically are less than about 3/16-¼ inch in diameter. The agglomerates of chopped fiber strand segments produced by the system and method of the invention have substantially reduced fuzz content and segments of only a few fibers. The agglomerates have substantially improved density and flow characteristics compared with conventional, non-agglomerated, dry chopped strand products, and equal or improved performance characteristics as reinforcements in various plastics and other matrices. Agglomerates run through conventional sorting devices to remove fuzz clumps, fines or lumps are further improved a small amount, because the agglomeration tends to eliminate fines and fuzz and the above method and system produces hardly any oversized lumps.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found having no further unexpected characteristics, the limits of those embodiments are within the meaning of the term about as used herein. It is not difficult for the artisan or others to determine whether such an embodiment is either as expected or, because of either a break in the continuity of results or one or more features that are significantly better than those reported by the inventor, is surprising and thus an unobvious teaching leading to a further advance in the art.

DETAILED DESCRIPTION OF THE INVENTION

Figure 1:
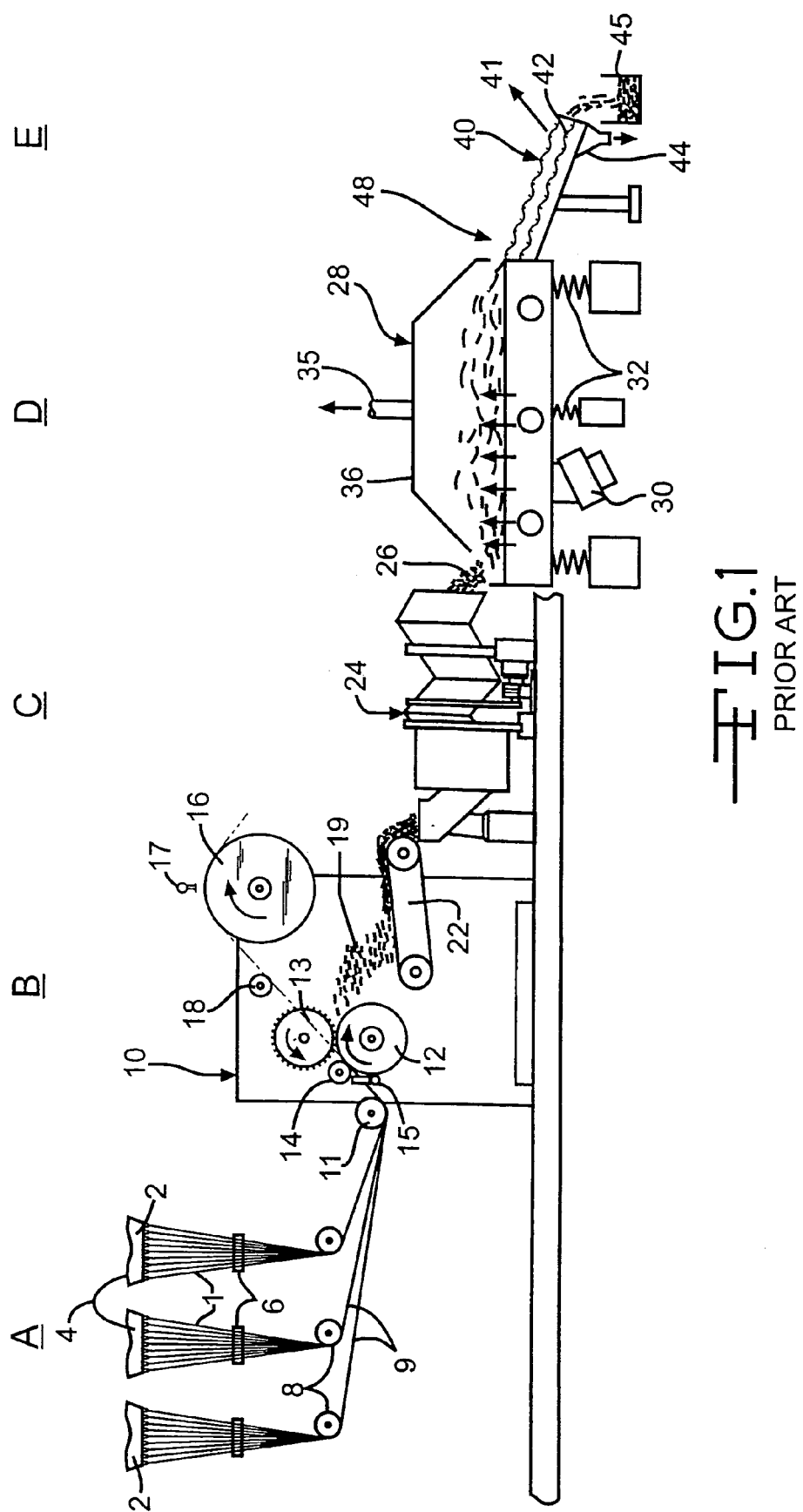
FIG. 1 is a front view of a prior art system for making agglomerates of wet chopped strand.

FIG. 1 shows a prior art system used to manufacture agglomerated chopped strand products with different process portions labeled as A, B, C and D. Portion A is the fiber forming part of the system. Portion B is the chopping part of the system. Portion C is the agglomerating part of the system and portion D is the drying, sorting and packaging part of the system.

Fibers 1, such as glass or polymer fibers, are formed by passing the molten form of the material through nozzles 2 in the bottom of bushings 4, fiberizers, in a known manner and the fibers 1 are pulled rapidly to attenuate the fibers to the desired diameter and to quickly cool the fibers 1 with air to below their softening point. A fine mist of water is sprayed on the fibers to help cool them and the fibers 1 are rapidly pulled into contact with the roller of a chemical sizing applicator 6 where the surfaces of the fibers are coated with any one of numerous chemical sizings. The sizings are usually water based and typically contain a resinous film former, a silane and one or more surfactants or wetting agents, cross linkers etc. The type of sizing used is determined by the type of polymer or other matrix that the fibers will be used to reinforce as is well known. The present invention is applicable to a broad range of sizing compositions. The sizing composition is not a part of the present invention but rather the present invention is applicable to many known sizings.

The chemically coated, wet fibers are next pulled around a grooved pulley 8 that gathers all of the fibers 1 from the bushing 4 into a single strand 9. The fiber strands 9 can contain any number of fibers from a few hundred to more than 4000. The fibers 1 and the fiber strands 9 are usually pulled at the desired speed by the chopper in part B of the system, which in this case is a chopper 10. The strands 9 may be pulled over a strand guide roll 11 that keeps individual strands 9 separated. Chopper 10 is a known fiber strand chopper comprising a backup roll 12, a blade roll 13, a knurled idler roll 14, a strand moving finger 15, a strand starting roll 16, a roll starting switch 17, and a new strand grooved roll, 18. The chopper 10 and its operation are disclosed in detail in U.S. Pat. No. 6,148,640, the disclosure of which is hereby incorporated herein by reference.

The chopper 10 separates the fiber strands 9 into segments 19 of desired length. The fiber strand segments 19 are collected on a belt conveyor 22 and transported to part C of the prior art system, which is an agglomerator for chopped strand segments 19. The agglomerator 24 shown here is disclosed in detail in U.S. Pat. No. 5,945,134 and therefore will not be described further here. Other devices for agglomerating or pelletizing chopped strand segments have been disclosed in other U.S. patents such as U.S. Pat. Nos. 3,984,603, 4,107,250, 4,164,534, 4,840,755, 5,002,827, 5,185,204, 5,269,993, 5,578,535, 5,639,807,5,693,378, 5,585,180, 5,868,982, however many of the devices and methods disclosed in these additional patents have not always met all of the current requirements of the customers for agglomerated chopped strand products, or have been costly to operate for making glass and/or polymer fiber segments.

Following agglomeration, the agglomerated chopped strand agglomerates 26 (agglomerates), which are still wet, must be dried. This is accomplished by feeding the agglomerates 26 into part D, a dryer. Many types of dryers have been used and one of the frequently used dryers is a vibrating fluid bed dryer 28. This type of dryer 28, also used to dry chopped fiber strand segments 20 to form conventional chopped strand reinforcement products, transports the agglomerates 26 on or above a perforated flat bed 30. The transporting force is supplied by an eccentric motor 30 acting on the dryer 28 which is mounted on springs 32. The drying and suspension of the agglomerates 26 in the dryer 28 is accomplished with hot air forced through ports 34 into a chamber 33 and on through perforations in the perforated blat bed 30 and a layer of the agglomerates 26 and finally through one or more exhaust stacks 35 in a hood 36 of the dryer 28. The chemical sizing in the agglomerates provides a weak bond in the agglomerates 26 that keeps them from breaking apart with handling, but allows the fibers to break apart and disperses in the plastic to which the agglomerates are later added.

The dry agglomerates 37 can be packaged immediately as they exit the dryer 28, or they can be run through an optional part E which is a sorter screen of any of various known types, such as the inclined multi deck sorter screen 38 comprising a top screen 40 to remove any lumps or clumps of fuzz that might be in the agglomerates through a side exit 39, a lower screen 42 which allows any fines in the dry agglomerates 37 to pass through to a bottom chamber and funnel 44 to a scrap bin (not shown). The sorted agglomerates 37 pass out of the sorter screen and into any package, such as a kraft board box 45. Known automatic packaging equipment can be included in part E but is not necessary.

The known system described above produces acceptable agglomerated or pelletized chopped strand reinforcement products, but it is desirable to simplify the agglomeration part of the system. The inventors have surprisingly found that when wet chopped fiber strand segments are vibrated in a wave like action by an elongated vibrating curved working surface, the desired agglomeration takes place in a very simple device with no large rotating parts, reduced wearing surfaces and with low energy usage. The inventors have also found that a device well known for milling hard minerals and stone to fine powder surprisingly provides the above described wave action needed to produce the desired agglomerates from ordinary wet chopped fiber strand segments.

Figure 2:
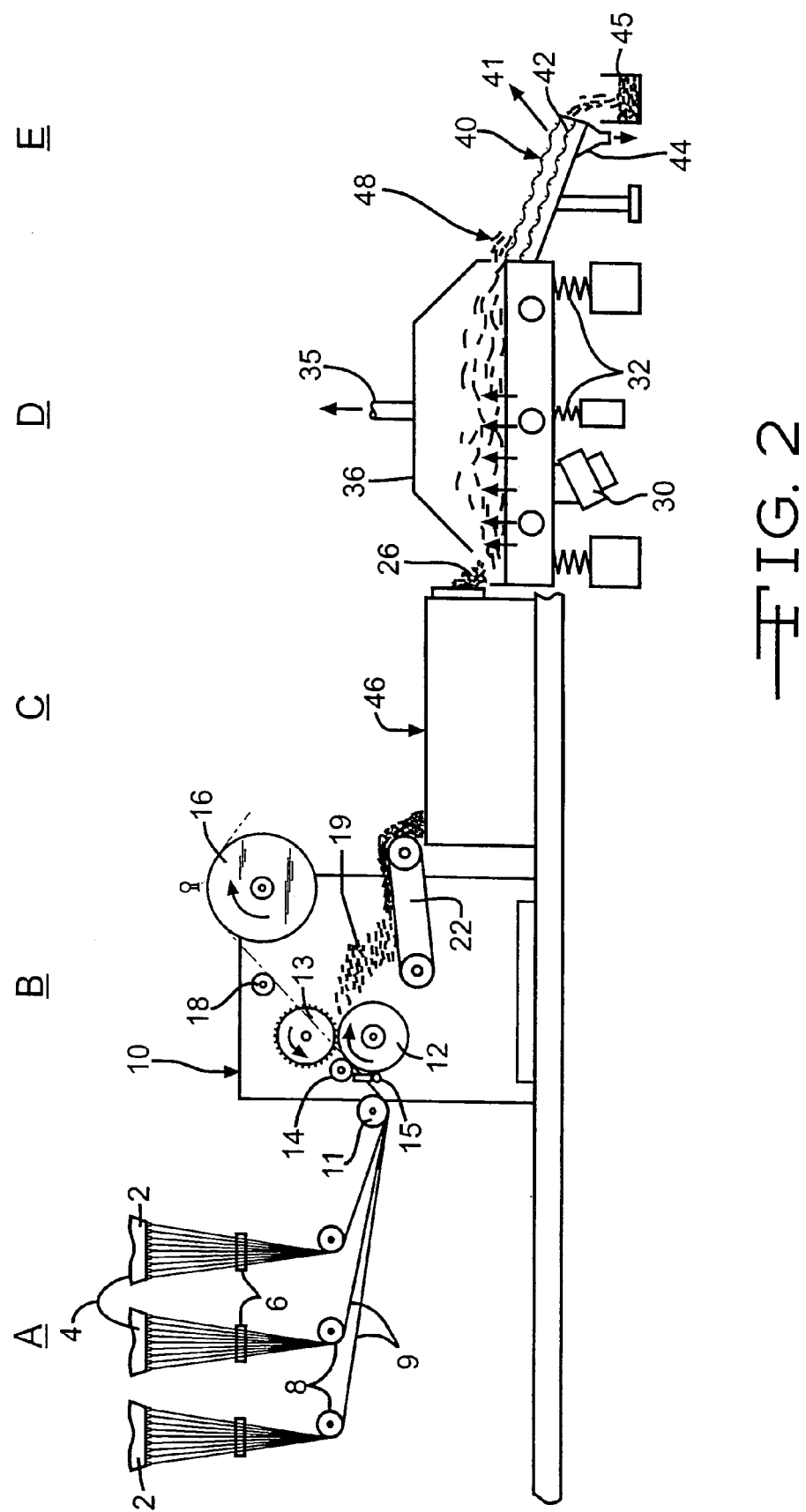
FIG. 2 is a front view of a system for making agglomerates of wet chopped strand in accordance with the present invention.

FIG. 2 shows the present inventive system. Parts A, B, D and the optional part E are just like the prior art system shown in FIG. 1, but part C, the wave chamber agglomerator 46 is a device that provides an elongated vibrating curved surface causing a wave like action described above which causes the wet chopped fiber strand segments 19 to agglomerate into wet, slightly flattened, shaped agglomerates 26 of desired size to form the desired agglomerated product 48. Typically, the agglomerates 26 will be about ⅛ inch to about ¼ inch long with the majority of the agglomerates having diameters of from about 0.06 inch to about 0.2 inch, but longer agglomerates up to about ½ inch are suitable for some applications. Preferably, at least 75 weight percent of the agglomerated product is in agglomerates of this diameter, more preferably at least 85 weight percent and most preferably at least 90 weight percent.

The method of agglomeration of the wet chopped strand segments 19 in the inventive system shown in FIG. 2 is the same as the method used with the conventional system shown in FIG. 1 except that the agglomeration takes place on or near a non-rotating curved, vibrating surface instead of on or near a series of rotating curved surfaces. In the present invention it is not necessary to add additional moisture or hydrating fluid to the chopped strand segments prior to agglomeration, nor is it necessary to add a binder or second sizing composition to the wet chopped strand prior to agglomeration. The moisture content of the wet chopped fiber strand coming from the chopper varies from about 10 wt. percent to about 16 wt. percent. Generally, the greater the moisture content the faster the chopped strand will agglomerate and the larger will be the agglomerates with the same residence time and vibration frequency. Preferably the moisture content is within the range of 12-15 percent, and in production units of 36 inches inside diameter of the vibrating drum or larger, the moisture content should not exceed about 15 wt. percent. When using a 36 inch diameter unit, the most preferred moisture content is in the range of about 12-13.5 wt. percent in the chopped fiber strand coming from the chopper and entering the wave chamber agglomerator.

Any vibrating elongated, concave, curved, surface is suitable for agglomerating the wet chopped strand segments 19. It is preferred that the non-rotating curved surface be a side of a cylinder or a segment or arc of a cylinder having a cross section of a circle, a portion of a circle, a semi-circle, or less than a semi-circle. However, curved surfaces having two or more radii are also suitable.

While a smooth inner curved surface is acceptable, it is preferred that the working surface be textured such as with small spaced apart dimples, ridges, X shaped or some other spaced apart raised forms to present reduced contact which prevents sticking of the wet chopped strand segments or partial agglomerates from sticking on the curved surface, yet providing a better gripping surface to enhance a lifting of the segments and agglomerates up the curved surface to optimize the wave action. Various "Toe Plates", sized and formed into a curved surface with the raised texture on the concave surface, are suitable. The preferred material is stainless steel, but other metals coated with non-corrosive coatings or various plastics, reinforced or not reinforced would also be suitable as would be various types of rubber known for use in wear resistant applications. A preferred dimpled material for the working surface is 304 stainless (#4) 5.WL product available from the Rigidized Metals. Corp. of Buffalo, N.Y.

While the curved portion can be 360 degrees it need not be. A curved portion containing about 210 degrees is suitable as are smaller portions, but the capacity might be reduced somewhat.

Figure 3:
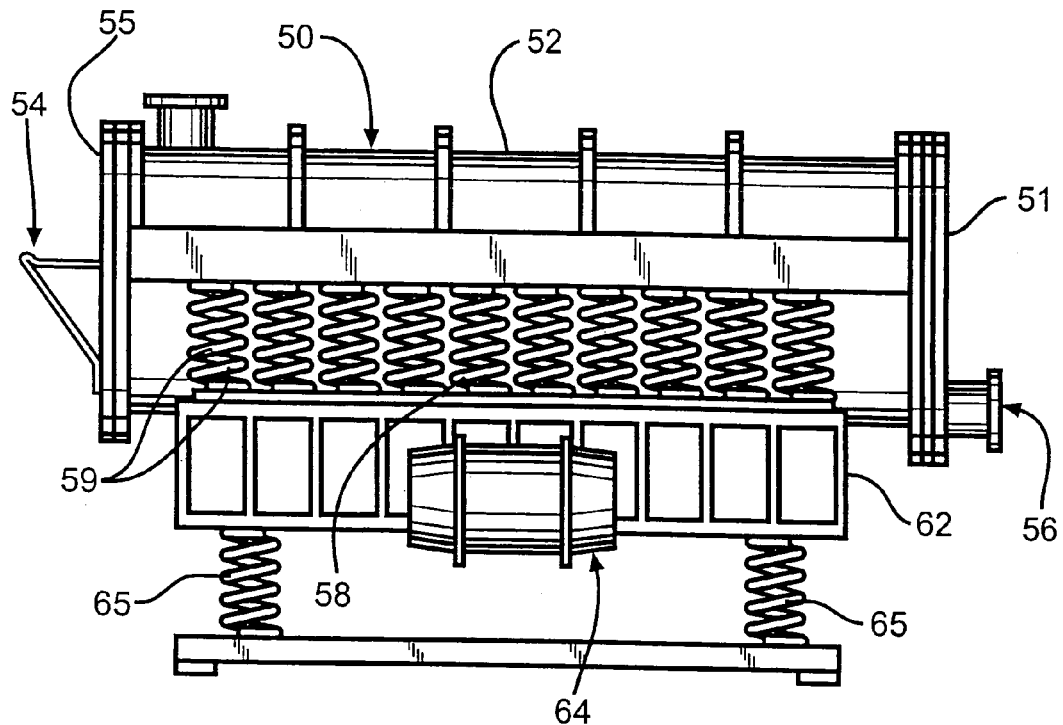
FIG. 3 is a front view of one device for agglomerating chopped strand segments in accordance with the present invention.
Figure 4:
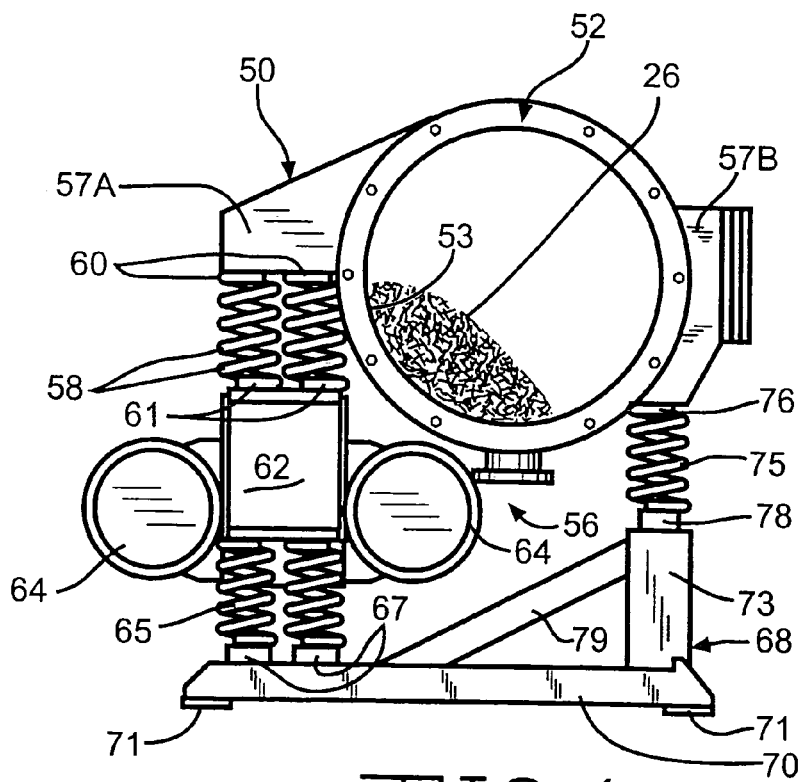
FIG. 4 is an exit end view of the device shown in FIG. 3 with the end cap with exit port removed to see the agglomerates.

Surprisingly, one type of device found by the inventors to be particularly suitable as the agglomerating device 46 in the present invention is shown in FIGS. 3 and 4. This type of device is available from General Kinematics Corp. of Barrington, Ill. under the name of Vibra-Drum®, a device normally used as a milling or grinding device for stone and minerals.

A Vibra-Drum® 50 is shown in front view in FIG. 3 and in an end view looking at the exit end with a front panel removed in FIG. 4. The device 50 is comprised of a generally horizontal cylindrical wave chamber 52 (chamber) having a feed port 54 in an entrance end cap end and an exit port 56 at the bottom or 6 o'clock position on a downstream end cap 51. The wave chamber 52 can be of various diameters depending upon the capacity desired and the length of the wave chamber. Generally horizontal means that the cylindrical wave chamber 52 can be horizontal, but preferably several degrees from horizontal such as less than 10 degrees from horizontal. Diameters of about 2-3 feet are known to be satisfactory and it is believed that other diameters would also be satisfactory, such as 42 inch diameter or larger.

Normally the cylindrical wave chamber 52 will decline from an entrance end to an exit end. The angle of declination will affect the retention time of the wet chopped strand segments 19 and wet agglomerates 26 in the cylinder 52 and preferably is adjustable. The chamber 52 has a working surface 53 on its interior.

The chamber 52 is mounted on a frame piece 57A attached to one side of the chamber 52 and on a second frame piece 57B attached to an opposite side of the chamber 52. The frame piece 57A is supported by an array of coil springs 58. The array of coil springs 58 comprises a plurality of coil springs 59, preferably arranged in two spaced apart and parallel rows. Each of the coil springs 59 are attached on their top ends 60 to an underside of the frame piece 57A. Bottom ends 61 of the coil springs 59 are attached to the top of an elongated box like frame structure 62 having a length at least as long as the length of an array of the coil springs 58.

Mounted on opposite sides of said structure 62 and generally straddling an end-to-end vertical imaginary centerline of said structure 62 are two eccentric vibrators 64. The structure 62 and pair of vibrators 64 are supported on an underneath side by two pairs of coil springs 65. Each pair of coil springs 65 is located close to each end of the box channel member 62 as shown in FIG. 3. The two pairs of coil springs 65 are attached on their lower ends 67 to a frame 68. The frame 68 is comprised of a bottom member or plate 70 with a foot 71 on the underneath side at each corner of the bottom member 70 and two spaced apart upright legs 73 attached to the top of the bottom member 70. The upright legs 73 can be spaced apart about as much as the two pairs of coil springs 65 with each leg 73 being aligned with each coil spring in the pair of coil springs 65, but spaced apart such that each of the legs 73 is on the opposite side of the bottom member 70 from the pair of coil springs 65 it is aligned with.

The second frame piece 57B is supported on its bottom side by at least two spaced apart coil springs 75 with the top 76 of each coil spring 75 being attached to the underneath side of the frame piece 57B and the bottom 77 of each coil spring 75 being attached to the top 78 of one upright leg 73. The upright legs 73 can be further supported by arm braces 79 attached at one end close to an upper end of each leg 73 and at the other end to a spot on the upper side of the bottom member 70 spaced from the upright leg 73 as shown in FIG. 4.

The generally horizontally wave chamber 52 is therefore totally supported by coil springs which produce a wave like action on the wet chopped strand segments 19 that are fed through the feed port 54 and also on the wet agglomerates 26 as they approach the exit port 56. A particular advantage of the VibraDrum® device shown above is that because of the array of coil springs 58 located between the vibrators 64 and said wave chamber 52, the vibrators 64 are smaller, requiring less electrical energy usage than if the vibrators were attached rigidly to said wave chamber 52. The wave chamber 52 on VibraDrum® equipment can arranged to be on either the right of the vibrators 64 or on the left, looking from the feed end, usually dictated by the orientation of the equipment feeding the chopped strand segments to the wave chamber 52. The unit shown in FIGS. 3-4 is a right hand unit. Vibrating wave chamber equipment are advantageous compared the tumbling devices used in the past because they are easier to operate and maintain.

FIG. 4 shows a typical position of the wet agglomerates 26 and wet chopped strand segments 19 in an operating VibraDrum® with the array extending from about 5 o'clock to about 9 o'clock on the curved working surface 53. Thus, about 120 degrees of the curved surface inside the wave chamber 52 is a "working" surface and the remainder of the curved surface, at this feed rate, does not necessarily contact the wet chopped strand segments 19 or the wet agglomerates 26 and therefore can be modified in many ways. The feed rate will vary depending upon the size and length of the generally horizontal wave chamber. Also, even fewer degrees of the curved surface will be a "working" surface at reduced feed rates or if a longer wave chamber at greater declination is used. For example, as little as about 45-70 degrees of contact with the working surface is suitable, as is about 45 to about 120 degrees, but about 90 to about 100 degrees or about 90 to about 110 degrees is preferred. A working surface of at least about 60 degrees with at least about 45 degrees being on a working side of a vertical centerline running through the wave chamber is also suitable.

Figure 8:
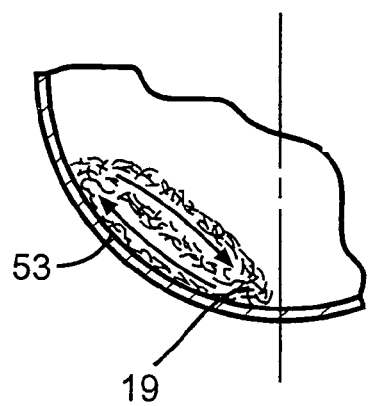
FIG. 8 is a partial cross section of the wave chamber shown in FIGS. 3 and 4 and shows a working surface producing the wave like action that agglomerates chopped strand segments in the present invention.

The important thing is to obtain a wave like movement inside the wave chamber, as shown in FIG. 8 on or adjacent a portion of a wave chamber having a working surface 53. The wet chopped fiber strand segments 19 are moving in a wave like pattern as shown by the arrows, working their way up the curved working surface 53 until they reach a maximum height based on the feed rate and the vibration frequency, then curling over and flowing down the inside over the upwardly moving segments 19 until they again contact the working surface 53 and repeat the pattern. This occurs many times down the length of the wave chamber 52 until the now agglomerates 26 reach the exit. Preferably one or more rubber dampers supplied by the manufacturer can be used between adjacent coils of one or more of the coil springs if the vibrating tube tends to rock back and forth from side to side in operation.

At any given feed rate, the angle of declination of the wave chamber is adjusted to give the residence time needed to form the agglomerates described above. Typically, a residence time of up to about 120 seconds, preferably about 40-60 seconds is preferred, but this can change depending on the type of segments being processed, other machine variables and the desired size and/or shape of the finished agglomerates. While declinations up to 10 degrees are possible, lower declinations of up to about 5 or 6 degrees are more typical. With a 36 inch diameter Vibradrum®, a preferred declination angle is about 4.5 degrees. The vibration frequency can be varied to produce the wave action by changing the RPM's of the vibrator motors that are typically variable speed motors. Vibration frequencies in the range of about 500 to about 1200 RPM are normally suitable to achieve the wave action. A typical vibration frequency on a 36 inch diameter unit is in the range of about 875-925 RPM with a range of about 885-905 RPM, such as about 890-895. A frequency of 893 RPM proved especially effective with a moisture content of 12.5-13.5 wt. percent and a declination angle of about 4:5 degrees on a 36 inch diameter by 10 foot long Vibradrum® unit.

Figure 5:
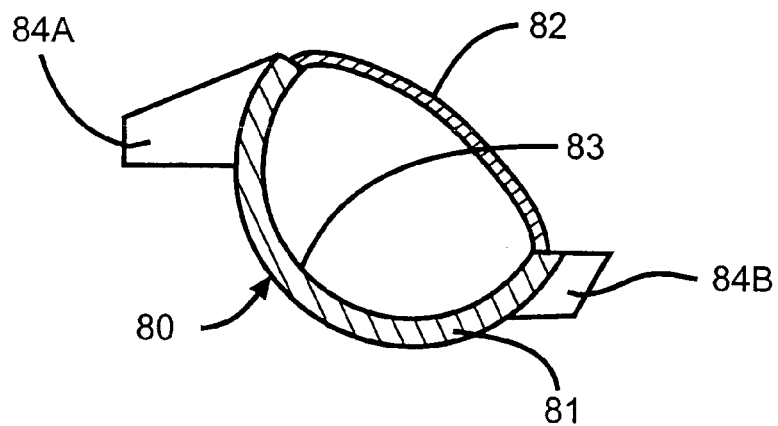
FIG. 5 is a cross section of a wave chamber of another agglomerating device suitable for the invention.

One possible modification is shown in FIG. 5 which is a partial cross section down the length of an elongated curved wave chamber 80. A concave working surface 83 is vibrated to act on wet chopped strand segments to agglomerate them. The chamber 80 has a cover 82 that can be a straight plate or a slightly curved convex plate as shown in FIG. 5 or can be slightly curved concave. The wave chamber 80 also has a frame piece 84A attached to a top of one side and a second frame piece 84B attached to the top of the other side. The wave chamber 80 and frame pieces 84A and 84B are supported and vibrated in a same or similar manner as the cylindrical wave chamber 52 shown in FIGS. 3 and 4.

Figure 6:
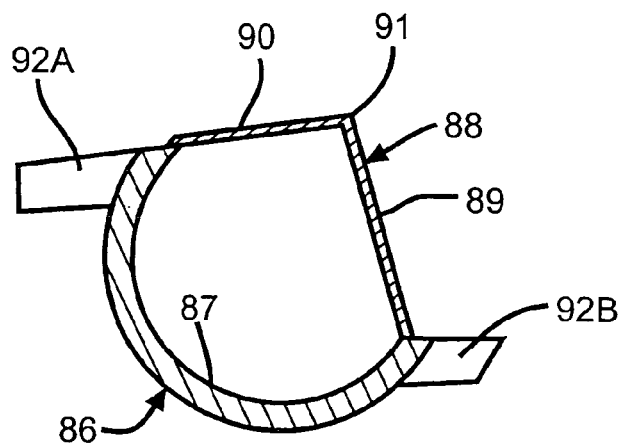
FIG. 6 is a cross section of a wave chamber of still another agglomerating device suitable for the invention.

Another possible modification is shown in FIG. 6 which is a partial cross section taken along the length of an elongated curved wave chamber 86. A concave working surface 87 is vibrated to act on wet chopped strand segments to agglomerate them. The chamber 86 has a cover 88 that has at least two straight pieces 89 and 90 that intersect and join at an angle 91 as shown in FIG. 6. The wave chamber 86 also has a frame piece 92A attached to a top of one side and a second frame piece 92B attached to the top of the other side.

The wave chamber 86 and frame pieces 92A and 92B are supported and vibrated in a same or similar manner as the cylindrical wave chamber 52 shown in FIGS. 3 and 4.

Figure 7:
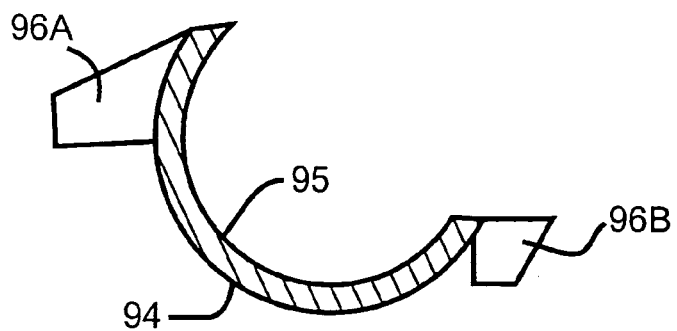
FIG. 7 is a cross section of a wave chamber of yet another agglomerating device suitable for the invention.

A still further modification is shown in FIG. 7, a partial cross section along the length of an elongated curved wave chamber 94. A concave working surface 95 is vibrated to act on wet chopped strand segments to agglomerate them. The wave chamber 94 has no cover, but instead is open to the atmosphere. An optional hood (not shown) could be mounted over the open top of the wave chamber 94 to catch and remove any fibers or moisture escaping out of the open top of the wave chamber 94 if desired. The wave chamber 94 also has a frame piece 96A attached to a top of one side and a second frame piece 96B attached to the top of the other side. The wave chamber 94 and frame pieces 96A and 96B are supported and vibrated in a same or similar manner as the cylindrical wave chamber 52 shown in FIGS. 3 and 4.

Figure 9:
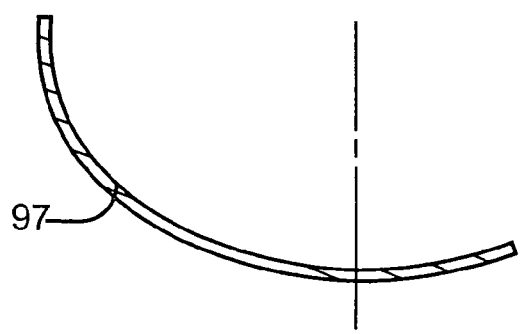
FIGS. 9 and 10 show optional working surfaces having two or more radii.
Figure 10:
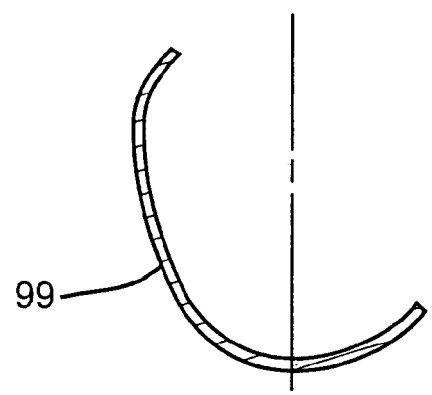

The radius of the curved working surface need not be constant as FIGS. 9 and 10 illustrate. A working surface 97 in FIG. 9 has two radii and a working surface in FIG. 10 has more than two radii.

On all of the many wave chamber devices disclosed above, the location of the vibrators and the array of coil springs between the vibrators and the wave chamber can be changed. For example, the elongated curved surface wave chamber can be supported on each side with coil springs mounted on a supporting frame and the array of coil springs, box channel and opposed vibrators can be attached to the wave chamber near the top of the wave chamber. The only critical requirement is an elongated curved working concave surface acted upon to produce a wave-like motion on chopped strand segments and agglomerates contacting the concave surface.

To practice the present invention using a system of the present invention as disclosed above, including the disclosure of FIGS. 2-4, conventional wet chopped fiber strand segments containing a conventional sizing for a plastic material and a moisture content in the range of about 10 to about 16 wt. percent, on a dry basis, and chopped into segments with any conventional chopper, such as shown in parts A and B of FIGS. 1 and 2, are fed into an entry port of an agglomerator containing an elongated curved surface wave chamber such as the VibraDrum® device shown in FIGS. 3 and 4. The angle of declination and the feed rate are adjusted to produce a retention time in the agglomerator of between about 1-3 minutes. The actual feed rate, angle of declination and frequency will vary depending on the size of the wave chamber and the type of wet chopped strand segments being agglomerated and the agglomerate size desired.

The amplitude of vibration of the wave chamber can also be varied to produce the desired wave action and agglomerate size. Typically, an amplitude of about 0.625 inch is used, but this can be varied up or down as desired.

A retention time longer than about 120 seconds, more typically longer than about 40-60 seconds could be used, but the minimum retention time to achieve the agglomerate size desired is best to avoid possible damage to the fibers, especially on the outside layer of the agglomerates. The length of the chamber will also affect retention time and capacity of the wave chamber. Normally, the length of the wave chamber is fixed once a unit is installed. Wave chambers about 4 feet long and about 8 feet long are known to be satisfactory and no reason is known why other lengths, within reason, would not also be suitable.

If the agglomerates are larger than desired, several things can be done to reduce the agglomerate size as discussed above. Another thing that can be done to reduce agglomerate size is to reduce the moisture content of the chopped strand segments before they are fed into the wave chamber. This may require some drying of the segments between the chopper and the wave chamber because the addition of more water and/or sizing to the segments after chopping is not required in the present process.

The wet agglomerates 26 are fed into a dryer such as the conventional vibrating, fluid bed dryer shown in part D of FIGS. 1 and 2, and preferably processed with a conventional screen sorter shown as part E in FIGS. 1 and 2 to produce finished agglomerated chopped fiber strand reinforcement product. Typical moisture contents of the wet chopped fiber strand segments coming from the chopper are in the range of about 10 to about 15 wt. Percent, on a dry basis, i.e. based on the wt. of the dried segments The agglomerated chopped fiber strand reinforcement product produced in the present system and by the present method had substantially improved bulk density and flow characteristics compared with conventional non-agglomerated chopped fiber strand reinforcement products, and apparently similar characteristics as competitive agglomerated chopped fiber strand reinforcement products.

For example, conventional wet chopped fiber strand segments having a moisture content of 12 to 13.5 wt. percent, on a dry basis, were passed through the wave chamber device having an internal diameter of about 24 inches, shown in FIGS. 3 and 4, at vibration frequencies of 700 to 900 RPM and then run through parts D and E of the process shown in FIG. 2 to form dry agglomerated chopped fiber strand reinforcement products. The residence time in the wave chamber device was about 2 minutes, plus or minus 1 minute and the angle of declination was about 2 degrees. Two conventional agglomerated products were made as described just above, one from ⅛ inch long chopped strand containing a first conventional sizing and one from 3/16 inch long chopped strand containing a second conventional sizing. The resultant agglomerated products were labeled Product XA and Product XB respectively. Some key characteristics of these agglomerated products were measured and compared with results from the same tests on products made by passing the same conventional wet chopped fiber strand segments through parts D and E of the system shown in FIG. 2 and labeled CSA and CSB respectively. The test results are shown below.

| Product | Bulk Volume* | Tapped Volume* | Flow (Seconds)** |
|---|---|---|---|
| XA | 170 | 132 | 67 |
| CSA | 226 | 144 | 248 |
| XB | 160 | 128 | 111 |
| CSB | 196 | 140 | 328 |

*Volume in cubic centimeters per 500 gram sample.
**Flow was determined by timing how long it took a 2000 gram sample to flow through an FMC FM-T01-A-1 vibrating hopper having a 1½ inch diameter × 6 inch straight outlet.

The higher bulk density of the agglomerated products result in being able to either place more weight in the standard sized box or other package or allow a smaller package to be used to ship the same weight as used for the conventional chopped fiber strand products and also allow more product to be stored in available space in the manufacturer's plant and in the customer's plant. The faster flow of the agglomerated products result in fewer plug-ups in the customers' hoppers and feed tubes and in increased flow rates through existing customer equipment thus removing this equipment where that is the barrier to increased production rates.

While only preferred embodiments have been disclosed in detail above, many additional embodiments are possible and obvious to one of ordinary skill given the above disclosure and the claims are intended to include such embodiments and obvious equivalents thereof. Agglomerating parameters may have to be changed with some sizing compositions, but it will be within the skil of an ordinary artisan, given the above disclosure, to use the above disclosed invention to agglomerate wet chopped strands having all kinds of sizing compositions on the surface of the fibers.

The invention claimed is:

1. A system for making agglomerated fiber strand segment reinforcing products comprising one or more fiberizers for converting molten material to a plurality of fibers, one or more applicators for applying an aqueous chemical sizing to the fibers, one or more guides for gathering the plurality of fibers into one or more strands, a chopper for separating the wet strands into segments, and an agglomerator for combining two or more of said segments into agglomerates and a dryer for drying said agglomerates, the improvement comprising that the agglomerator comprises a generally horizontal, non-rotating wave chamber having an elongated, curved, vibrating working surface for contact with the wet chopped strand segments, a working surface that is concave in cross section on a plane perpendicular with the length of the wave chamber.

2. The system described in claim 1 wherein the curved working surface is an arc of a circle and contains at least about 60 degrees with at least a majority of the at least about 60 degrees being on one side of an imaginary vertical line running through the lowest point on the working surface.

3. The system described in claim 2 wherein all of the at least about 60 degrees is on one side of said vertical line.

4. The system of claim 1 wherein said wave chamber is supported entirely with springs.

5. The system of claim 2 wherein said wave chamber is supported entirely with springs.

6. The system of claim 1 wherein the vibration of the working surface is provided with one or more vibrators, the vibrators being separated from said wave chamber by springs whereby the vibration is transmitted through the springs.

7. The system of claim 2 wherein the vibration of the working surface is provided with one or more vibrators, the vibrators being separated from said wave chamber by springs whereby the vibration is transmitted through the springs.

8. The system of claim 5 wherein the vibration of the working surface is provided with one or more vibrators, the vibrators being separated from said wave chamber by springs whereby the vibration is transmitted through the springs.

9. The system of claim 6 wherein the vibrators are mounted on a member, which member supports said springs separating said wave chamber from said vibrators, said member also being supported on springs mounted on a base.

10. The system of claim 7 wherein the vibrators are mounted on a member, which member supports said springs separating said wave chamber from said vibrators, said member also being supported on springs mounted on a base.

11. The system of claim 8 wherein the vibrators are mounted on a member, which member supports said springs separating said wave chamber from said vibrators, said member also being supported on springs mounted on a base.

12. A system for making agglomerated fiber strand segment reinforcing products comprising one or more fiberizers for converting molten material to a plurality of fibers, one or more applicators for applying an aqueous chemical sizing to the fibers, one or more guides for gathering the plurality of fibers into one or more strands, a chopper for separating the wet strands into segments, and an agglomerator for combining two or more of said segments into agglomerates and a dryer for drying said agglomerates, the improvement comprising that the agglomerator comprises a generally horizontal, non-rotating wave chamber having an elongated, curved, vibrating working surface for contact with the wet chopped strand segments, a working surface that is concave in cross section on a plane perpendicular with the length of the wave chamber and wherein said working surface is vibrated by one or more vibrators that are separated from said working surface by a plurality of springs, said vibrators being separated from a base by one or more springs.

13. The system of claim 12 wherein said working surface has one or more radii and comprises at least 60 degrees on one side of an imaginary vertical line passing through the lowest part of the working surface.

14. A system for making agglomerated fiber strand segment reinforcing products comprising one or more fiberizers for converting molten material to a plurality of fibers, one or more applicators for applying an aqueous chemical sizing to the fibers, one or more guides for gathering the plurality of fibers into one or more strands, a chopper for separating the wet strands into segments, and an agglomerator for combining two or more of said segments into agglomerates and a dryer for drying said agglomerates, the improvement comprising that the agglomerator comprises a wave chamber having an elongated generally horizontal, non-rotating, curved, vibrating working surface for contact with the wet chopped strand segments, a working surface that is concave in cross section on a plane perpendicular with the length of the wave chamber.

15. The system described in claim 14 wherein the curved working surface is a portion of a circle and contains at least about 60 degrees with at least a majority of the at least about 60 degrees being on one side of an imaginary vertical line running through the lowest point on the working surface.

16. The system described in claim 15 wherein all of the at least about 60 degrees is on one side of said vertical line.

17. The system of claim 14 wherein said wave chamber is supported entirely with springs.

18. The system of claim 15 wherein said wave chamber is supported entirely with springs.

19. The system of claim 14 wherein the vibration of the working surface is provided with one or more vibrators, the vibrators being separated from said wave chamber by springs whereby the vibration is transmitted through the springs.

20. The system of claim 15 wherein the vibration of the working surface is provided with one or more vibrators, the vibrators being separated from said wave chamber by springs whereby the vibration is transmitted through the springs.

21. The system of claim 17 wherein the vibration of the working surface is provided with one or more vibrators, the vibrators being separated from said wave chamber by springs whereby the vibration is transmitted through the springs.

22. The system of claim 14 wherein said working surface has one or more radii and comprises at least 60 degrees on one side of an imaginary vertical line passing through the lowest part of the working surface.

* * * * *